(12) United States Patent
Boardman (10) Patent No.: US 8,335,374 B2
(45) Date of Patent: Dec. 18, 2012

(54) IMAGE SEGMENTATION

(75) Inventor: Jago Boardman, Newcastle upon Tyne (GB)

(73) Assignee: Genetix Corporation, San Jose, CA (US)

( * ) Notice: Subject to any disclaimer, the term of this patent is extended or adjusted under 35 U.S.C. 154(b) by 681 days.

(21) Appl. No.: 12/540,308

(22) Filed: Aug. 12, 2009

(65) Prior Publication Data

US 2011/0038523 A1 Feb. 17, 2011

(51) Int. Cl.
*G06K 9/00* (2006.01)
(52) U.S. Cl. ........................................................ 382/165
(58) Field of Classification Search ........................ None
See application file for complete search history.

(56) References Cited

U.S. PATENT DOCUMENTS

| | | | |
|---|---|---|---|
| 6,600,786 B1 * | 7/2003 | Prakash et al. | 375/240.25 |
| 7,295,711 B1 * | 11/2007 | Ahuja et al. | 382/225 |
| 7,925,084 B1 * | 4/2011 | Skirko | 382/162 |
| 7,929,755 B1 * | 4/2011 | Skirko | 382/164 |
| 2010/0111396 A1 * | 5/2010 | Boucheron | 382/133 |

FOREIGN PATENT DOCUMENTS

| | | |
|---|---|---|
| WO | WO 01/13263 A2 | 2/2001 |
| WO | WO 2006/076312 A2 | 7/2006 |

OTHER PUBLICATIONS

"Introduction to the Color Structure Code and its Implementation", Lutz Priese, Patrick Sturm, http://www.uni-koblenz.de/~lb/lb_downloads/download/csc.pdf, Mar. 2003.*
"Touching Cells Splitting by Using Concave Points and Ellipse Fitting", 2008 Digital Image Computing: Techniques ad Applications, Dec. 1-Dec. 3, 2008, pp. 271-278.*
European Search Report from EP 10250935.3, dated Nov. 24, 2010.
Luo et al.; "Perceptual grouping of segmented regions in color images"; *Pattern Recognition*; 36(12): 2781-2792 (Dec. 2003).

(Continued)

*Primary Examiner* — Samir Ahmed
(74) *Attorney, Agent, or Firm* — Kilpatrick Townsend & Stockton LLP (57) ABSTRACT

A method for classifying pixels in an image, e.g. a microscopy image, as being associated with a feature of interest has been described. A color brightfield microscopy image represented by color values for an array of pixels is conventionally obtained. The image is over-segmented based on the color values to provide a plurality of groups of contiguous pixels with related color values, whereby a typical feature of interest will be represented by multiple segments. A list of pairs of segments which are adjacent to one another in the image is generated, and a difference in average color value between the segments comprising each pair is determined. Pairs of adjacent segments are then selectively joined together to form a joined segment to replace the corresponding pair of segments in the list if pre-defined joining criteria are met. The pairs are considered for joining in an order based on their respective differences in average color value. Pixels are then classified as being associated with the feature of interest based on the segments following the selective joining. Segmentation information indicating the pixels classified as being associated with the feature of interest is thus provided.

18 Claims, 7 Drawing Sheets

OTHER PUBLICATIONS

Morse, Brian S. "Lecture 18: Segmentation (Region Based)"; Brigham Young University. 1998-2000. Retrieved online at http://homepages.inf.ed.ac.uk/rbf/CVonline/LOCAL_COPIES/MORSE/region.pdf.

Priese et al.; "Introduction to the Color Structure Code and its Implementation"; Mar. 24, 2003 (20 pages) Retrieved online at http://www.uni-koblenz.de/~lb/lb_downloads/download/csc.pdf.

Rehrmann et al.; "Fast and Robust Segmentation of Natural Color Scenes"; *Lecture Notes in Computer Science*, 1351:598-606 (Jan. 1998).

Trémeau et al.; "Regions Adjacency Graph Applied to Color Image Segmentation" *IEEE Transactions on Image Processing*; 9(4):735-743 (Apr. 2000).

Wittenberg et al.; "Image segmentation of cell nuclei based upon classification in the color space" in 4th European Conference of the International Federation for Medical and Biological Engineering (Nov. 23-27, 2008; Antwerp, Belgium); *IFMBE Proceedings*; 22: 613-618 (2008).

\* cited by examiner

IMAGE SEGMENTATION

BACKGROUND ART

The invention relates to segmenting images, i.e. the process of classifying pixels in an image as being associated with features of interest. For example, embodiments of the invention relate to automatically segmenting cell nuclei in color-stained immunohistochemical (IHC) microscopy images.

Image segmentation is a fundamental tool in image processing. It is the partitioning of an image into regions (segments), usually to help identify objects of interest. Thus the fundamental aim of segmentation is to identify groups of pixels in an image that are associated with one or more objects of interest. For example, in analysing a color-stained IHC image, a user may be interested in studying cell nuclei, e.g. to determine a ratio of stained to unstained nuclei. To do this the user must first identify the nuclei. This can be time consuming and, if done manually, is prone to user-subjectivity. In many circumstances it is therefore desirable to use an automated process for segmenting images whereby images are numerically processed to identify objects of interest according to pre-defined segmentation criteria. The segmented image may then be analysed, for example by visual inspection through a step of displaying the image on a monitor with an indication of the segmentation, and/or by numerical image processing that takes account of the segmentation.

In many cases automatic image segmentation is difficult to implement reliably. This is particularly true for biological application where objects can display a wide range of morphological characteristics in different tissue samples and under different staining/imaging conditions. There are various known segmentation schemes which may be used, and in general the different schemes have different efficacies for different situations.

Some known image segmentation algorithms do not consider the spatial relationships between pixels in an image during the segmentation. Instead, pixels are classified according to groupings they form when their individual properties are plotted in a "feature space" which does not take account of spatial relationships. The "feature space" is characterised by parameters considered appropriate for differentiating between pixels associated with the object(s) of interest and other pixels. These approaches include common techniques such as thresholding, color depth reduction, histogram splitting and feature-space clustering. However, a drawback of these schemes for some applications is that the relative positions of the image pixels are not considered. This means potentially important/useful information is not used, so the segmentation may not as good as it could be.

There are also known segmentation algorithms which are based on spatial information. These may be based on techniques such as "region growing", "split and merge", "watershed", "edge detection and linking", and so on. These schemes consider both the relative positions of pixels and the similarities/differences among them. This can produce good results, but can work less well when boundaries between objects cannot be deduced purely from the information in the image itself, for example when there are multiple touching objects of the same image intensity.

When applied to digital microscope images of tissue samples, the goal of segmentation is usually to separate out the parts of the image corresponding to features such as cells, and their constituent parts such as nuclei and membranes. The inventor has found that existing segmentation schemes are often unable to deal well with these sorts of image. There is therefore a need for improved schemes for classifying pixels in an image as being associated with a feature of interest.

SUMMARY OF THE INVENTION

According to a first aspect of the invention there is provided a method for classifying pixels in a microscopy image as being associated with one or more features of interest, the method comprising: (a) obtaining an input data set comprising color values for an array of pixels representing the image; (b) segmenting the image based on the color values to provide a plurality of segments, each segment comprising a group of contiguous pixels with related color values; (c) generating a list of pairs of segments which are adjacent to one another in the image; (d) determining a difference in average color value between the segments comprising each pair in the list; (e) selectively joining pairs of adjacent segments to form a joined segment to replace the corresponding pair of segments in the list according to at least one pre-defined joining criterion, wherein pairs of segments are considered for joining in an order based on the respective differences in average color values; (f) classifying pixels as being associated with one or more of the features of interest based on the segments following the selective joining; and (g) providing an output data set indicating pixels classified as being associated with one or more of the features of interest.

Thus in accordance with embodiments of the invention, a scheme for segmenting images using color as a primary discriminator is provided. The scheme is based on segmenting an image, and then selectively rejoining neighboring segments if certain pre-defined rejoining criteria are met. The criteria may be based on a priori information about the expected characteristics of a target feature of interest. This approach has been found by the inventor to provide more reliable automatic segmentation than seen with conventional techniques.

The pixel classification may be used to determine whether a corresponding sample is associated with a specific biological condition, for example. In this regard an image that is classified (segmented) in accordance with embodiments of the invention may be treated as if were a conventional segmented image and may be displayed/used to determine if it is associated with a sample having a particular biological condition in the same way as conventional segmented images are used.

The at least one pre-defined joining criterion of step (e) may be such that a pair of segments is not joined if their combined size in the image is greater than a pre-defined maximum segment size threshold. This can help guide the rejoining aspect of the overall segmentation process by helping to avoid creating segments which are unlikely to correspond to the target of interest because they are larger than the expected size for features of interest in the image. This can help, for example, avoid two separate but touching features of interest from being considered a single feature.

In addition, or alternately, the at least one pre-defined joining criterion of step (e) may be such that a pair of segments is joined if at least one of the segments has a size in the image that is less than a pre-defined minimum segment size threshold.

In addition, or alternately, the at least one pre-defined joining criterion of step (e) may also be such that a pair of segments is not joined if the resulting average color value for the joined segment would differ from the average color value of any of the segments from step (b) which comprises the pair of segments by more than a pre-defined maximum average color difference threshold.

Step (e) may be performed such that pairs of segments are considered for joining in an order in which the pair of segments currently having the smallest difference in average color values, and which has not previously been considered for joining, is the pair next considered for joining. This approach based on considering pairs in order of increasing color difference has been found to provide good results.

The method of embodiments of the invention may further comprise identifying a subset of the pixels potentially associated with the feature of interest based on their color values, and wherein the segmenting of step (b) is then applied to pixels within this subset. Furthermore, pixels which are not included in the subset of pixels based on their color values, but which are fully surrounded in the image by a contiguous region of pixels which are included in the subset of pixels based on their color values, may also be added to the subset. This "masking" approach reduces the processing required by discounting pixels from being considered as associated with the feature of interest early in the processing. In addition, an overall improvement in the classification of pixels is provided as the masking approach has been found to result in finally deduced segments with sharper boundaries which are better matched to features of interest in the image.

The segmenting of step (b) may be based on a Color Structure Code (CSC) algorithm.

The segmenting of step (b) may be performed such that a typical feature of interest in the image having an associated typical range of color values is segmented into multiple segments. This over-segmentation combined with selective rejoining has been found to provide good results. The number of multiple of segments (i.e. the typical degree of over-segmentation) may, for example, be selected from the group comprising at least 3, at least 4, at least 5, at least 6, at least 7, at least 8, at least 9 and at least 10 segments. Thus features of interest in the image may segmented such that the average number of segments associated with respective features is selected from the group comprising at least 3, at least 4, at least 5, at least 6, at least 7, at least 8, at least 9 and at least 10 segments.

The method may further comprise a step performed after step (e) of selectively splitting segments into pairs if a pre-defined splitting criterion is satisfied. For example, the splitting criterion may be such that a segment having a kink in its boundary is split along a line joining to the kink. This can help split separate but touching features that have erroneously been identified as one feature.

Step (f) may comprise classifying those pixels within a subset of the segments resulting from the selective joining as being associated with the feature of interest, where the subset of segments corresponds to the segments which meet a pre-determined classification criterion. For example, the pre-determined classification criterion for the segments may be based on comparing a geometric characteristic of the segments in the image with a corresponding pre-determined geometric characteristic threshold. For example, the geometric characteristic may comprise an areal extent, a linear dimension, and/or a measure of elongatedness. This approach can help distinguish segments resulting from the process of selective rejoining based on expected characteristics of the features of interest for the application at hand.

As is conventional, the images may in general be represented by data sets, e.g. according to any known image-data format. The method may operate on an apparatus such as a suitably configured special purpose computer, or a general purpose computer programmed with particular software for implementing the method. Software for implementing the method may be stored on a computer-readable storage medium in accordance with embodiments of the invention.

Pixel classifications resulting from embodiments of the invention may be further analysed according to any known techniques, for example, by visual inspection through a step of displaying the image on a monitor with an indication of the pixel classifications, and/or by numerical image processing of the classified pixels.

Thus the pixel classification for the image of the sample may be presented to a user as a graphic display with image pixels in regions of the of the graphic display displayed with a characteristic (e.g. brightness/color/outline) based on their classification. Alternatively, or in a addition, the classification information may be provided by way of a data structure, e.g. in a conventional segmentation format, stored in a memory such that a user may subsequently access/retrieve data representing the segmentation from the memory for display and/or further analysis.

According to another aspect of the invention there is provided an apparatus for classifying pixels in a microscopy image as being associated with a feature of interest, the apparatus comprising: a source for an input data set comprising color values for an array of pixels representing the image; and a processor operable to segment the image based on the color values to provide a plurality of segments comprising respective groups of contiguous pixels with related color values; to generate a list of pairs of segments adjacent to one another in the image; to determine a difference in average color between the segments comprising each pair in the list; to selectively join pairs of adjacent segments to form a joined segment to replace the corresponding pair of segments in the list according to at least one pre-defined joining criterion, wherein pairs of segments are considered for joining in an order based on their respective differences in average color; to classify pixels as being associated with the feature of interest based on the segments following the selective joining; and to generate an output data set representing pixels classified as being associated with the feature of interest.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
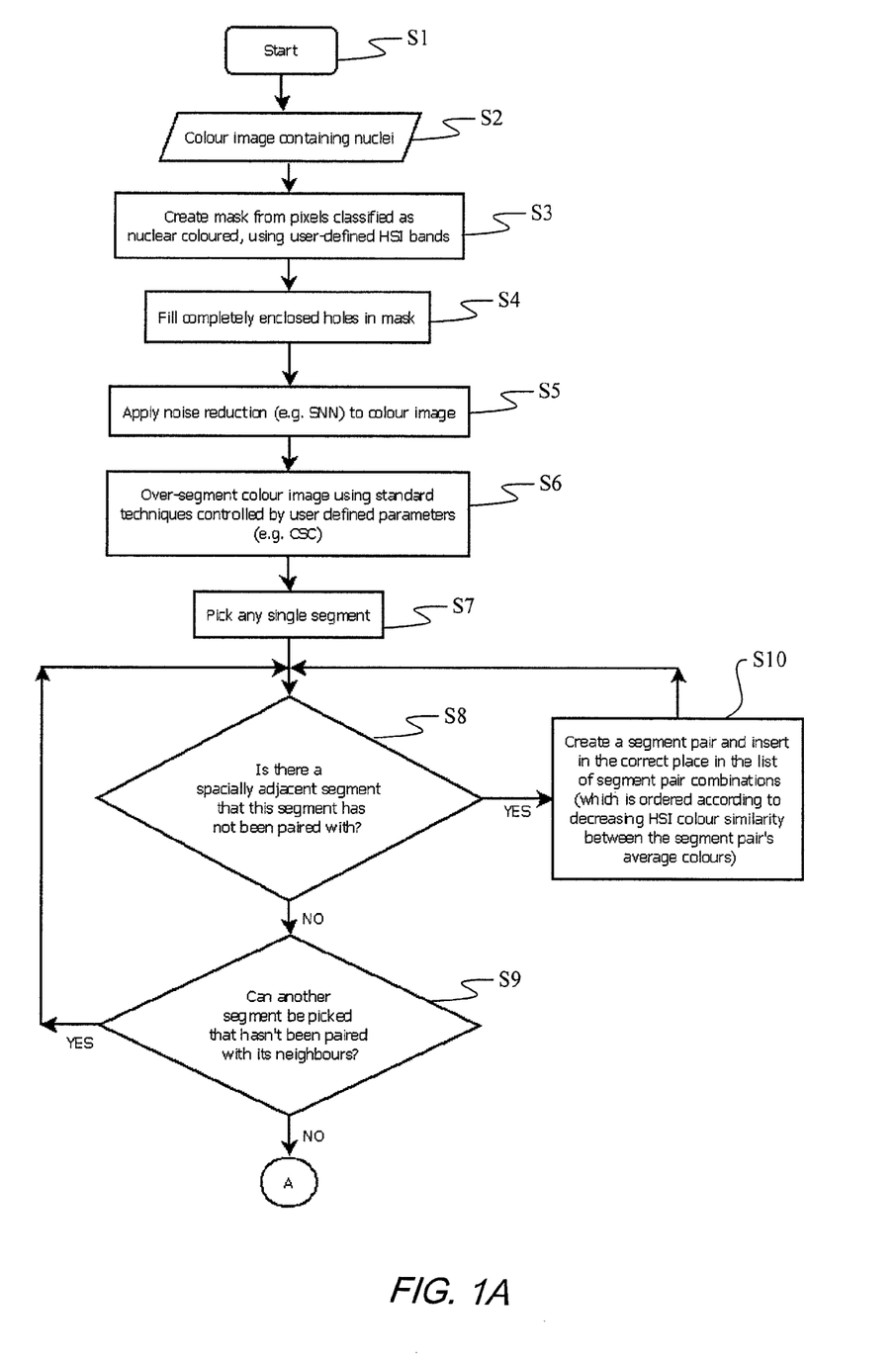
FIGS. 1A, 1B and 1C together show a flow diagram representing a scheme for processing images of cell nuclei according to an embodiment of the invention.
Figure 1B:
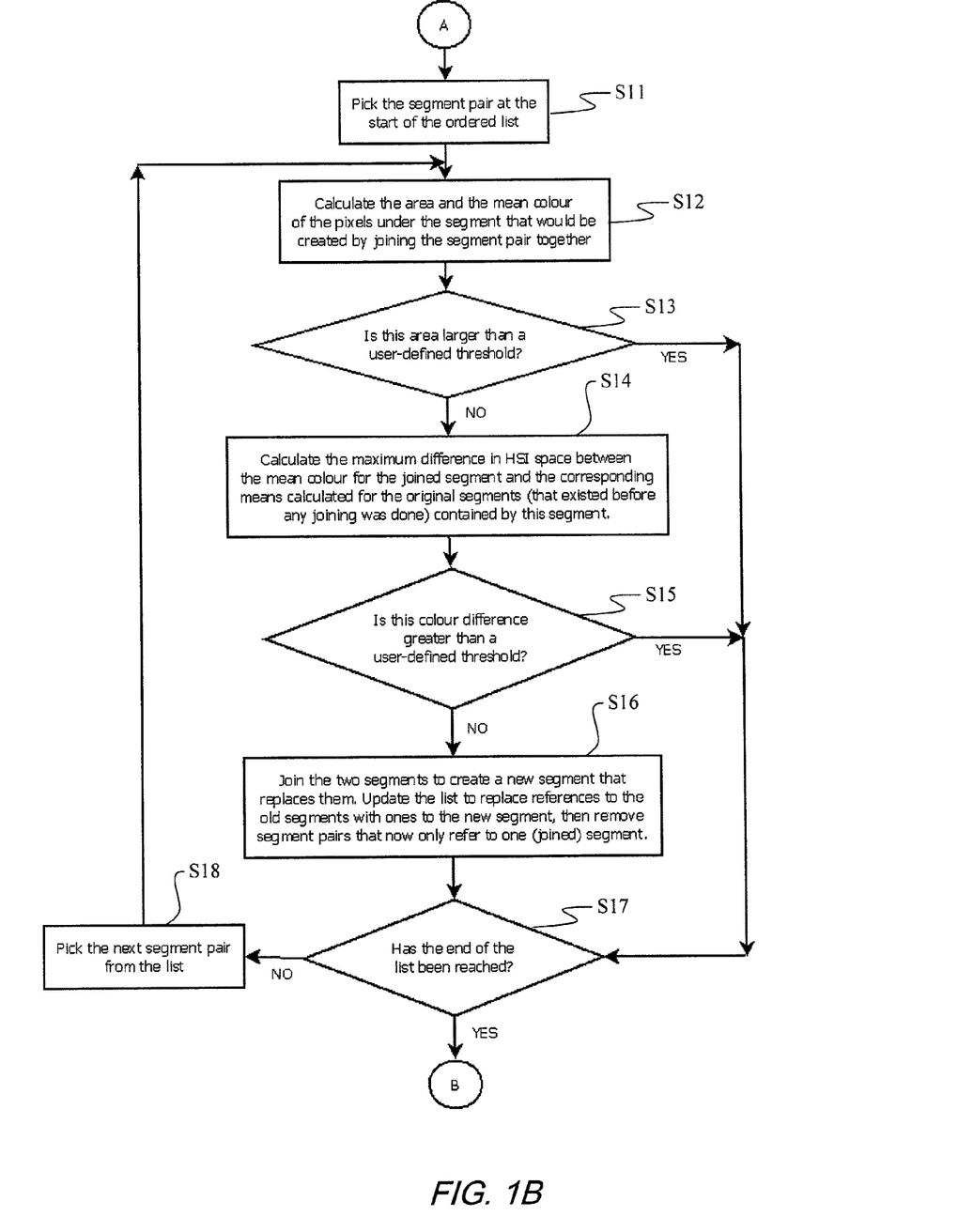
Figure 1C:
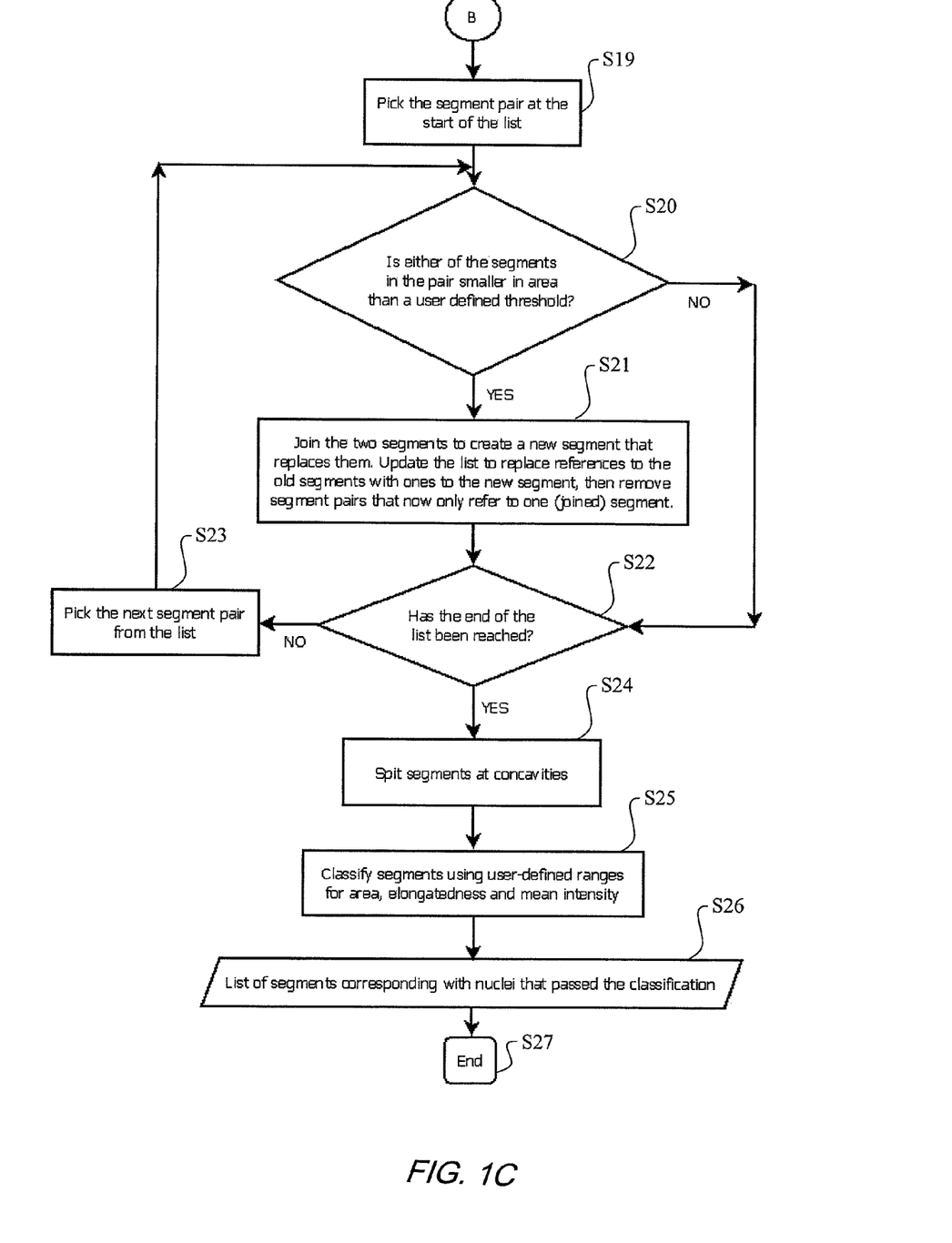

FIGS. 1A, 1B, and 1C (collectively referred to as FIG. 1) schematically show a flow diagram representing a method for segmenting an image of biological cells according to an embodiment of the invention. The method may be implemented by a conventional computer operating under control of appropriately configured software. In this example the method is applied to a conventional color-stained IHC digital microscopy image of a tissue sample of interest which has been obtained in a conventional manner. However, the method may equally be applied to any other form of color image obtained using any conventional techniques, e.g. fluorescence images.

Figure 2:
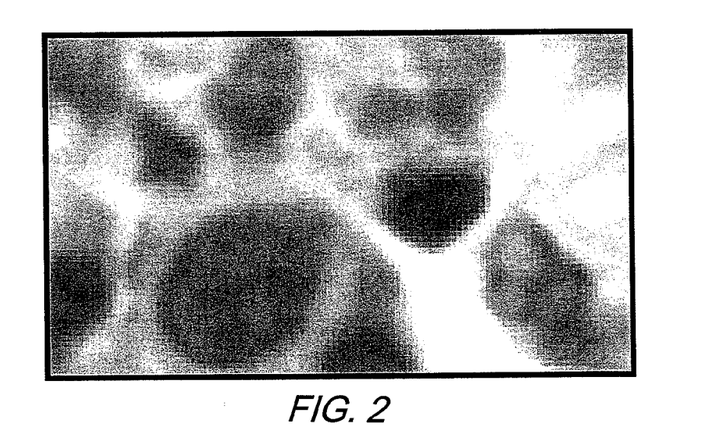
FIG. 2 schematically shows a grey-scale representation of a color image of a conventional immunohistochemical slide which may be processed in accordance with the method represented in FIGS. 1A, 1B and 1C.

FIG. 2 schematically shows a grey-scale representation of an example color-stained IHC image of a tissue sample which may be processed in accordance with embodiments of the invention. As is conventional, the image of FIG. 2 is represented by a data set that defines the imaged characteristic (i.e. color) over an array of pixels that may be spatially mapped to the sample tissue. In this example, the image is obtained for a conventional blue-stained IHC tissue sample using a conventional microscope with digital color imaging capability. Each pixel is associated with a color value defined by three parameters. As is well known, there are many ways of defining a color value for a pixel in a digital image. Here it is assumed the Hue-Saturation-Intensity (HSI) model is used for defining a pixel's color value in color space. Other schemes (e.g. based on a Red-Green-Blue (RGB) parameterisation) could equally be used. Color values are thus defined by the three parameters H, S and I. The H, S and I values may, for example, be parameterized such that each runs from 0 to 1. A color difference between two colors may be defined to be the Euclidean distance between the colors in color space (e.g. sqrt$[\Delta H^2 + \Delta S^2 + \Delta I^2]$).

In the below-described example of processing in accordance with the method of FIG. 1, it is assumed the aim of the segmentation is to automatically identify pixels in the image of FIG. 2 which are associated with cancerous cell nuclei in the sample. That is to say, the segmentation target is cancerous cell nuclei. Typically cancerous nuclei appear in brightfield IHC images, such as shown in FIG. 2, with a different shape and average intensity from other nuclei, for example they tend to be larger, rounder and lighter.

Referring to FIG. 1A, processing starts at Step S1.

In Step S2 a conventionally color-stained IHC image of cell nuclei to be studied is obtained. This may be obtained directly from a digital imaging microscope, or from a database/store or previously obtained images. As noted above, FIG. 2 shows an example of such an image. The image of FIG. 2 is represented in grey-scale, but in practice the image will be a color image. For a blue-stain IHC technique, the image will appear to be generally blue, but may also include other colors, e.g. brown. However, since the color image primarily comprises one color (i.e. primarily the blue stain color), the monochrome representation of FIG. 2 is not missing substantial levels of detail compared to what is seen in a full color representation and so is suitable for demonstrating the principles of processing in accordance with embodiments of the invention.

In Step S3, each pixel in the image is classified according to whether its color value (as defined by the color space parameters being used—in this example, H, S, and I) falls within a range expected for the material of interest in the sample. The range will depend on characteristics of the sample and staining method used. The range of colors can be defined in various ways. For example, it may be defined to encompass pixels having a colors value within a given color distance of an expected color for the segmentation target (i.e. falling within a pre-defined sphere in color space). In another example, it may be defined to encompass pixels having values of H, S and I within predefined ranges associated with the expected range of colors for the segmentation target of interest (i.e. falling within a pre-defined cuboid in color space). This binary classification is implemented in this example by defining a mask image. The mask image comprises an array of pixels corresponding to the image under analysis. Each pixel in the mask image is associated with a binary classification parameter—e.g. a zero value if the corresponding pixel location in the IHC image is considered to fall within the expected color range for the segmentation target, and a unit value if it is considered to fall outside the expected color range for the segmentation target.

Figure 3:
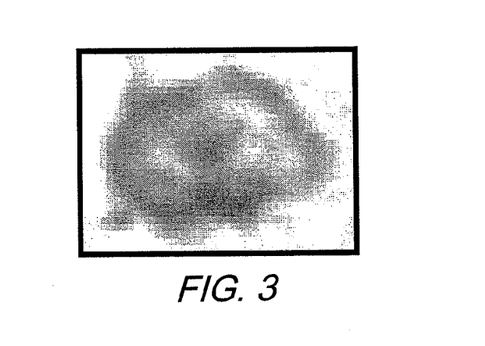
FIG. 3 schematically shows a grey-scale representation of a portion of a color image of a conventional immunohistochemical slide which may be processed in accordance with the method represented in FIGS. 1A, 1B and 1C.
Figure 4A:
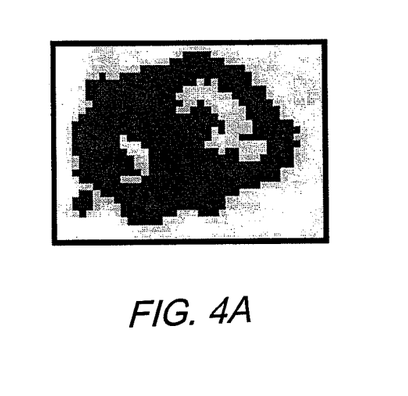
FIGS. 4A and 4B schematically shows pixel masks associated with the image portion of FIG. 3 and which are generated during processing in accordance with the method represented in FIGS. 1A, 1B and 1C.

FIG. 3 schematically shows a portion of an IHC image similar to that shown in FIG. 2. FIG. 4 shows the image of FIG. 3 overlain with a mask image determined according to Step S3 of the method of FIG. 1. The mask image is displayed as black where the corresponding pixel of FIG. 3 is considered to fall within the expected color range for the target signal of interest, and is displayed transparent elsewhere. The expected color range for the segmentation target used in step S3 may be based, for example, on existing information on how the segmentation target of interest is colored for the staining technique used.

Figure 4B:
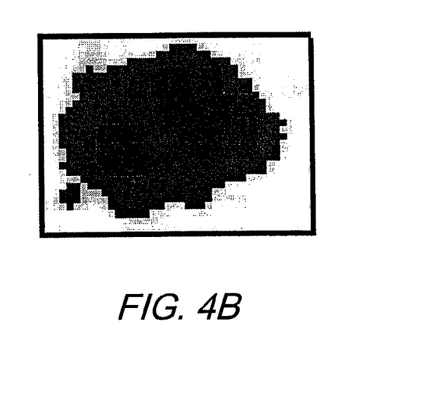

In Step S4 the mask image resulting from Step S3 is processed to identify any pixels classified as being outside the expected color range of the segmentation target of interest, but which are enclosed by a contiguous block of pixels within the expected color range. These enclosed pixels in the mask image are re-classified as if the corresponding pixels in the IHC image had been determined to be within the expected color range. Thus Step S4 in effect fills any holes in the mask image. The result of this is schematically shown in FIG. 4B for the mask of FIG. 4A. This is intended to "fill-in" holes within nuclei in which the cell periphery comprises pixels classified as being inside the expected color range, but the cell interior does not. Thus in some cases it may be appropriate to only fill-in a hole if the hole has a size below a threshold, e.g. below a size corresponding to a fraction of an expected size of a nuclei in the image, e.g. a size that is half that of the expected size of a nuclei may be used. This will thus avoid filling a hole that is not related to the nuclei, but which is defined by a closed ring of touching nuclei.

The overall aim of Steps S3 and S4 is thus to identify pixels that are outside regions of pixels considered to be of an appropriate color for the segmentation target of interest and any relatively small regions of pixels enclosed by these regions. These may be referred to as pixels that are outside the mask. Pixels that are within regions of pixels considered to be of an appropriate color for the segmentation target may be referred to as pixels that are inside the mask, or simply masked pixels. The pixels deemed to be outside the mask (i.e. the pixels shown transparent in FIG. 4B for that example image) are removed from further consideration in the segmentation processing. Thus Steps S3 and S4 not only reduce the area to be processed further, hence improving efficiency, these steps also provide a reduced chance for pixels in the image which are not even the correct color from being mistakenly included in a region classified as corresponding to the segmentation target of interest.

In Step S5 a spatial smoothing filter is applied to the color image. In some examples the filtering might only be applied to regions of the image deemed to be inside the mask. However, in this example the filtering process is applied to the whole image, which may be more practical for some filtering algorithms. Any of the many well known spatial smoothing algorithms can be used. In this example a conventional symmetric nearest neighbor (SNN) algorithm is used. The SNN algorithm may be applied independently to the H, S and I values associated with the respective pixels or simultaneously based on distances in color space, for example. The SNN filter in particular can reduce noise in images while preserving edge content. Although shown as a step performed after Steps S3 and S4 in FIG. 1, in practice the filtering step of Step S5 may be performed before steps corresponding to Steps S3 and S4.

In Step S6 a conventional color segmentation algorithm is applied to the masked pixels. In this example, the well-known CSC (color structure code) algorithm is used. The result of the CSC-based algorithm is an identification of contiguous groups of masked pixels that are considered (based on their color characteristics) to relate to the same object in the image. CSC-based algorithms have been found to provide good results, but the nature of the segmentation algorithm is not crucial, and other algorithms could equally be used.

The CSC segmentation algorithm is controlled by a segmentation parameter that determines the degree of segmentation. In effect the segmentation parameter defines how different the color values of neighboring pixels can be for the pixels to still be classified as belonging to the same segment. In one application of the CSC algorithm the segmentation parameter runs from 0 to 255. A segmentation parameter towards 0 leads to a high degree of segmentation (i.e. a fine segmentation resulting in many segments), while a segmentation parameter towards 255 leads to a low degree of segmentation (i.e. a coarse segmentation resulting in few segments). In accordance with embodiments of the invention, the segmentation parameter is chosen so as to purposely over-segment the image. That is to say the segmentation parameter is chosen so that more individual segments are identified in Step S6 than there are segmentation targets in the image. For example, the inventor has found good results if the segmentation parameter is chosen such that segmentation targets in the image are typically over-segmented by a factor 10 or so at this stage—i.e. the segmentation parameter is set so that a segmentation target will typically be deemed to comprise on the order of 10 or so separate segments. To achieve an appropriate degree of segmentation, the segmentation parameter may be set based on experience for the application at hand. For example, a user might use a "typical" image for the type of segmentation target, tissue sample and staining characteristics for the application at hand, and interactively adjust the segmentation parameter of the CSC algorithm until the desired degree (e.g. five or ten-fold) of over-segmentation is achieved. The resultant segmentation parameter derived from the "training" image may then be used for all other images. In embodiments of the invention and for images of the kind shown in FIG. 2, a CSC segmentation parameter of perhaps around 15 is found to be suitable.

As is conventional, the results of the segmentation of Step S6 can be represented in various ways. For example, as a data structure whereby the segmentation results may be represented as a listing of separately identified segments along with the an indication of the pixels deemed to be associated with the respective segments. The segmentation results may also be represented visually by overlying the image with indications of the boundaries between the various identified segments.

Figure 5:
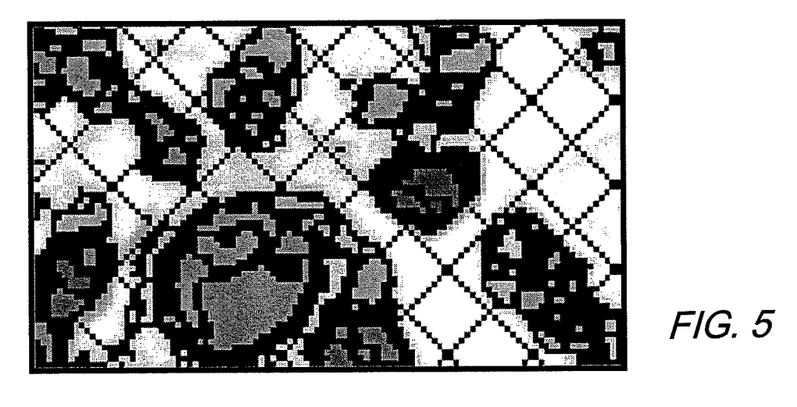
FIG. 5 schematically shows the image of FIG. 2 overlain with indications of an initial segmentation during processing in accordance with the method represented in FIGS. 1A, 1B and 1C.

FIG. 5 schematically shows a visual indication of the segmentation result from Step S6 applied to the image of FIG. 2. The image of the sample under study (after the filtering of Step S5) is shown with pixels at the boundaries of the different segments shown black. Region of the image of FIG. 5 identified by cross-hatching are regions deemed to be outside the mask generated at Step S3 for the image of FIG. 2. As noted above, these regions are excluded from the CSC segmentation of Step S6 because they are already deemed to be unrelated to the segmentation target of interest because they are not an appropriate color.

Thus the processing to Step S6 results in a color-based over-segmentation of regions of the image under study which are deemed to be within an appropriate color range for the segmentation target of interest.

The primary function of the next stages of the processing of FIG. 1 is to selectively join combinations of the segments shown in FIG. 5 according to various pre-defined rejoining criteria. For the purposes of explanation, the segments identified in the over-segmentation processing of Step S6 will be referred to as initial segments (or sometimes original segments). Any segments formed by combining two or more of the initial segments will be referred to as joined segments.

Processing steps S7 to S10 are for providing a listing of all adjacent pairings of initial segments sorted in order of increasing difference in average color between the segments of the respective pairs. This listing may be referred to as a color-difference sorted list of segment pairs. The average color for each initial segment may be parameterised by the independent averages of the respective H, S and I values for the pixels in the segment. The color difference between the respective average colors may be defined as set out above—i.e. based on the Euclidean distance between the respective colors in color space.

The processing of Steps S8 to S10 is iterative in that the various initial segments are processed in turn to identify all adjacent pairings. Step S7 defines the segment which is to be processed in the first of these iterations.

Thus in Step S7 one of the initial segments from Step S6 is selected to be the "current segment" for the first iteration of this sub-loop of the processing of FIG. 1. This segment may be selected randomly, or according to some objective criterion, e.g. it may be the segment comprising the most pixels. Whichever initial segment is selected as current segment for the first iteration is not significant. Because the order the segments are considered in this step does not matter, the segments will in general be picked in any order that does not require significant calculation (so as to increase overall speed). For example, the segments may be processed in an order determined from their positions in the image. E.g. the initial segment may be the one closest to a particular corner, with subsequently selected segments for subsequent iterations simply being the next one along in image, e.g. following a raster pattern.

In Step S8 the locations of pixels for the current segment of the present iteration (i.e. the segment selected in Step S7 for the first iteration) are compared with those of the other initial segments to identify segments which form adjacent pairs. If a segment pairing is identified which has not previously been stored in the color-difference sorted list of segment pairs (e.g. in a previous iteration through these steps), the processing of FIG. 1 follows the branch marked "YES" from Step S8 to Step S10.

In Step S10 the color difference between the average colors of the segments of the identified pairing is determined, and an indication of the paring is placed in the color-difference sorted list of segment pairs at the appropriate location (i.e. ranked according to color difference).

Processing continues to cycle through Steps S8 and S10 until all segment pairs associated with the current segment have been identified and placed in the listing at their relevant location.

Once it is determined in Step S8 there are no more segment pairings associated with the current segment not already stored in the color-difference sorted list, processing follows the branch marked "NO" from Step S8 to Step S9.

In Step S9 a segment to be used as the current segment for the next iteration is selected (assuming there is a new one left to select). Thus if there are any segments that have not yet been processed as the current segment for an iteration through Steps S8 to S10, one of these is selected (e.g., randomly, or based on location in the image) to be the current segment for the next iteration. Processing the follows the branch marked "YES" from Step S9 back to Step S8.

Steps S8, S9 and S10 are thus repeated iteratively until all initial segments have been processed as the current segment. (In practice there is no need to perform this iteration for the last of the initial segments since any pairings which include this segment would already have been identified in a previous iteration).

When it is determined in Step S9 that there are no further segments to process as the current segment, the color-sorted list of neighboring segment pairs is complete, and processing follows the branch marked "NO" from Step S9 to Step S11.

The next stages of the processing are directed towards traversing the list of neighboring pairs of segments in order of increasing color-difference, and selectively joining pairs of segments to form a corresponding joined segment if pre-defined joining criteria are satisfied. If a pair of segments are joined, the corresponding pairing is removed from the color-sorted list, and the joined segment takes the place of both the respective segments of the pair wherever they previously appeared in the list. In some embodiments the list may then be re-ordered to account for changes in color-difference among the pairs resulting from this replacement (because the single joined segment will generally have an average color different from the segments it replaces). However, in the Inventor's experience this does not generally provide significantly different results.

Thus selective rejoining is performed iteratively until there are no more pairs of segments in the color-sorted list which satisfy the joining criteria.

Thus in Step S11 the first segment pair is selected from the list (i.e. the pair of neighboring segments which are most similar in color). This becomes the current segment pair for the first iteration through this sub-loop of the processing of FIG. 1.

In Step S12 the combined size of the segments comprising the current pair and the average color of the pixels comprising the pair are determined. The combined size in this example is characterised by the combined area of the segments in the image (e.g. in terms of pixel numbers). In other embodiments the combined size may be parameterised by a characteristic dimension, e.g. a width, of a region corresponding to the two segments in the image. The average color may be determined from the average H, S and I values for the pixels (i.e. the centre of mass of the color values for the pixels comprising the segments in color space). This average color is in effect the average color of a segment that would be formed if the current pair of segments were joined together.

In Step S13, the combined size of the segments is compared with a pre-defined maximum segment size threshold for joined segments $S_{max}$. If the combined size of the segments for the current pair exceeds the maximum segment size threshold $S_{max}$, the pair of segments are not joined (i.e. they are kept separate). In this case processing follows the branch marked "YES" from Step S13 to Step S17, which is discussed further below. (It should be noted $S_{max}$ is a threshold for determining if two segments are to be joined. It is not a threshold that is applied to individual segments. Thus if a single segment already exceeds $S_{max}$ in size, it will never be joined in Step S13 (because the resulting joined pair would necessarily exceed the maximum segment size threshold for joined segments $S_{max}$), but the larger segment remains unaffected by the fact that in itself it already exceeds the maximum segment size threshold for joined segments $S_{max}$.)

The effect of Step S13 is that segments of a pair will not be joined together to form a single segment if the resulting segment would be bigger than a pre-defined size. The pre-defined size may, for example, be chosen to the same as or slightly bigger, e.g. 10% or 20% bigger, than the maximum size a feature of interest would typically be expected show in the image. This allows a priori information about the expected characteristics of the segmentation target of interest in the image to be used to control the way the segments resulting from the over-segmentation of Step S6 are rejoined to arrive at a final segmentation/classification. For example, initial segments may be prevented from being joined if the resulting segment would be too big to be considered as corresponding to the target of interest.

The most suitable maximum segment size threshold $S_{max}$ for a given application may be based on experience. For example, a user might use a typical "test" image containing examples of the segmentation target (the feature of interest) for the application at hand. The user may then adjust the maximum segment size threshold $S_{max}$ for subsequent operations of the method of FIG. 1 until it is determined that any objects in the image having a size greater than the maximum segment size threshold can, with a reasonable degree of confidence, be considered to be unrelated to the segmentation target. Another approach would be to set the parameter to as high a value as possible while still ensuring features of the test image which are known to be associated with the objects of interest correspond with at least one segment.

If in Step S13 it is determined that the combined size of the segments for the current pair does not exceed the maximum segment size threshold $S_{max}$, the pair are further considered for joining as processing follows the branch marked "NO" from Step S13 to Step S14.

In Step S14 the average color value for the segment that would result from joining the current pair of segments (determined at Step S12) is compared with the average color value of each of the initial segments which comprise the current pair. In particular the differences in average color between the segment that would result from joining the current pair of segments and the average colors of each of the initial segments comprising the current pair are determined. For early iterations the current pair of segments will generally comprise only two of the initial segments from the over-segmentation Step S6. However, in subsequent iterations the current pair of segments become more likely to comprise more than two of the initial segments. This is because one or both of the segments of the current pair may comprise multiple initial segments already joined in previous iterations.

In Step S15, the differences in average color from Step S14 are compared with a maximum segment color-difference threshold $\Delta C_{max}$. If any of the differences in average-color exceed the maximum segment color-difference threshold $\Delta C_{max}$, the current pair of segments are not joined (i.e. they are kept separate). In this case processing follows the branch marked "YES" from Step S15 to Step S17, which is discussed further below.

The effect of Step S15 is that segments of a pair will not be joined together to form a single segment if the resulting segment would have an average color that is more than a pre-defined amount different from the initial segments it would comprise. This step can help ensure that a joined segment is only created if it is not too different in color from any of the initial segments that it replaces, and therefore from any of the pixels it contains, and thus is representative of a broadly homogeneous region of color in the original image. When training this parameter (i.e. optimising the results of the processing of a test image for different values of the parameter), the user may seek to find the smallest value of color-difference threshold $\Delta C_{max}$ for which there are no segments corresponding to 'target' objects, which contain a significant number of pixels that do not belong to those objects.

If it is determined in Step S15 that none of the differences in average color from Step S14 exceed the maximum segment color-difference threshold $\Delta C_{max}$, processing follows the branch marked "NO" from Step S15 to Step S16.

In Step S16 the current pair of segments are joined together to form a new single segment, i.e. segment pairs are joined in this step on the basis they meet the pre-defined joining criteria of Steps S13 and S15. The reference to the current segment pair is removed from the color-difference sorted list, and other references in the list to the respective segments of the pair are replaced with references to the newly joined segment. That is to say, the joined segment replaces both segments of the current pair in the list. As noted above, in some embodiments the list may be re-ordered at this stage to account of the fact the single joined segment will generally have an average color different from the each of the respective segments it replaces, thus changing the color differences associated with the pairs in the list.

In effect Step S16 thus updates the color-difference sorted list of neighboring pairs of the initial segments as if the joined segments had in fact been deemed to be a single segment in the initial segmentation of Step S6.

In Step S17 a check is made to determine if the end of the list has been reached (i.e. whether all pairs in the list as it presently stands have been processed as a current pair in an iteration through steps S12 to S16).

If the end of the list has not been reached, processing follows the branch marked "NO" from Step S17 to Step S18 where the pair to be considered as the current pair for the next iteration is selected from the list. This next pair is the pair in the list associated with the lowest color-difference which has not previously been processed as a current pair (i.e. previously processed in an iteration through Steps S12 to S16 and not joined). Once the next pair is selected, processing returns to Step S12 and continues as described above. Segment pairs are considered for joining in this way until there are no new pairs to be considered for joining. At this stage it is determined the end of the list is reached and processing follows the branch marked "YES" from Step S17 to Step S19.

At this stage of the processing various ones of the initial segments from Step S6 will have been joined together to form larger segments so that overall there are fewer segments than initially identified in Step S6. As described above, the color-difference sorted list is updated as segments are joined and so the list will be shorter at this stage than when it was initially generated. I.e. the selective rejoining of Steps S12 to S16 results in fewer segments, and hence there are fewer adjacent segment pairs in the list.

The aim of the next stages of processing (Steps S19 to S23) is to identify segment pairs for which one of the segments is below a certain size. These segments are joined so that small segments are in effect absorbed into their neighbors.

Thus in Step S19 the first segment pair is selected from the list (i.e. the pair of neighboring segments which are most similar in color). This becomes the current segment pair for the first iteration through Steps S19 to S23.

In Step S20, the size of each of the segments is compared with a pre-defined minimum segment size threshold $S_{min}$. In this example the comparison is based on the areas of the segments in the image (i.e. in terms of pixel numbers). In other embodiments the size comparison may be based on a characteristic linear dimension of the segments in the image, e.g. a width.

If it is determined in Step S20 that neither segment in the current pair is smaller than the pre-defined minimum segment size threshold $S_{min}$, the pair of segments are not joined (i.e. they are kept separate) and processing follows the branch marked "NO" from Step S20 to Step S22.

If, on the other hand, it is determined in Step S20 that the size of at least one of the segments for the current pair is smaller than the minimum segment size threshold $S_{min}$, processing follows the branch marked "YES" from Step S20 to Step S21.

The effect of Step S20 is to allow segments to include relatively small areas of a significantly different color which have thus far been maintained as a separate segment because of their different color. Thus once the above-described steps S1 to S19 have been performed, any segments that are smaller than $S_{min}$ are joined to their most similar neighbouring segment (even, in this embodiment, if this would make that resulting joined segment exceed the $S_{max}$ or $\Delta C_{max}$ constraints). To "train" this parameter (i.e. optimise it through repeated application to a test image), it may be set to the largest value for which as many pixels of heterogeneous color that are actually part of a larger 'target' object are included in the main segments for those objects, without significant numbers of pixels that do not belong to those objects being included in their segments. An example of why this step may be helpful in some embodiments is that when segmenting an image of a tissue sample containing stained cell nuclei, the staining may have areas that are particularly dark or light due to the presence of 'subnuclear bodies' such as the nucleolus, or because of distortions or thinning of nuclei as a result of the tissue sample having been thinly sliced. It may be noted these areas may also have been holes in the mask, which were filled in step S4.

In Step S21 the current pair of segments are joined together to form a new single segment, i.e. segment pairs are joined here on the basis they meet the pre-defined joining criteria of Step S20. The reference to the current pair is removed from the color-difference sorted list, and any other references in the list to the segments of the pair are replaced with references to the newly joined pair. This step is thus similar to, and will be understood from Step S16 discussed above.

In Step S22 a check is made to determine if the end of the list has been reached (i.e. all of the pairs in the list as it presently stands have been processed as a current pair in an iteration through steps S20 and S21).

If the end of the list has not been reached, processing follows the branch marked "NO" from Step S22 to Step S23. In Step S23 the next pair to be considered as the current pair is selected from the list. This next pair is the segment pair in the list associated with the lowest color-difference and which has not previously been processed in steps S20 and S21. Processing then returns to Step S20 and continues as described above. Segment pairs are considered for joining in this way until there are no new pairs to be considered for joining. At this stage it is determined the end of the list is reached and processing follows the branch marked "YES" from Step S22 to Step S24.

At this stage the remaining segments (i.e. the segments appearing in the color-difference sorted list as it currently stands) generally comprise those segments which result from applying the rejoining criteria of Steps S13, S15 and S20 to the initial segments from the over-segmentation of Step S6. The segments at this stage thus generally define the regions in the image which are associated with the expected color of the segmentation target of interest, which are not too different in average color from any of the initial segments from Step S6 which they comprise (see Step S15), which are not larger than the expected size of the segmentation target of interest in the image (see Step S13), and which are not smaller than the expected size of the segmentation target of interest in the image (see Step S20). While the segments generally meet these criteria, there will be segments that do not. For example, an initial segment from Step S6 that is greater in size that the maximum segment size for re-joining (Step S13) may remain as a segment at this stage. Similarly, there may be segments that do not meet these constraints as a result of the filled holes of Step S4, or the re-joining of small areas regardless of color in Step S20.

Figure 6:
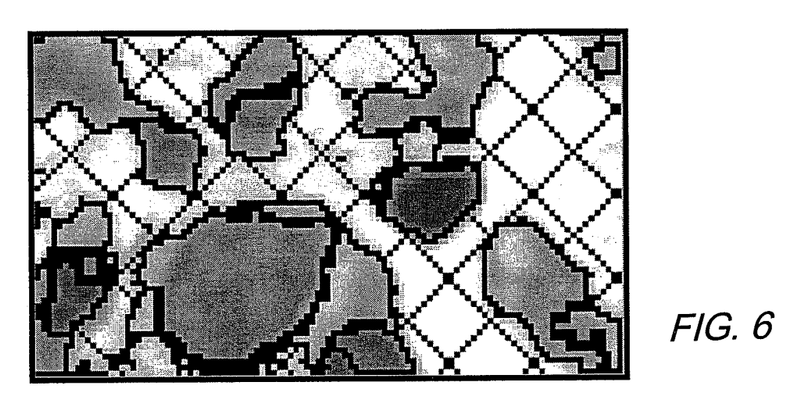
FIG. 6 schematically shows the image of FIG. 2 overlain with indications of an intermediate segmentation during processing in accordance with the method represented in FIGS. 1A, 1B and 1C.

FIG. 6 schematically shows a visual indication of the segmentation/classification results at this stage of the processing as applied to the image of FIG. 2. The image (after the filtering of Step S5) is shown with pixels at the boundaries of the different segments shown black. Region of the image of FIG. 6 identified by cross-hatching are regions deemed to be outside the mask generated at Step S3 for the image of FIG. 2. FIG. 6 shows how various ones of the initial segments resulting from the over-segmentation of Step S6 (represented in FIG. 5) are rejoined to form a smaller number of generally larger segments in accordance with the above-described processing. These segments represent candidates for the segmentation target of interest.

Figure 8:
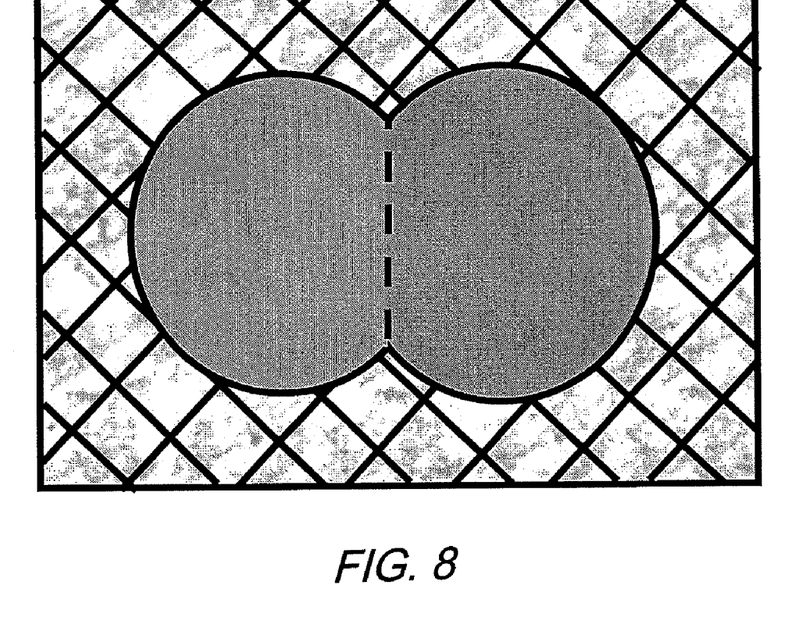
FIG. 8 schematically shows a grey-scale representation of an example immunohistochemical slide processed in accordance with an embodiment of the invention.

One issue that impacts the ability of segmentation schemes to properly segment an image arises where there are separate but touching segmentation targets in the image. FIG. 8 schematically shows this potential situation. Here two generally circular nuclei are shown touching in an example image. The interface between the nuclei is schematically shown by the dashed line. In many cases the maximum segment size control provided by Step S13 will prevent two nuclei such as this from being considered a single segment. However, it is assumed here the two nuclei are smaller than average and processing in accordance with an embodiment of the invention has, at least in the first instance, determined that the two nuclei comprise a single segment. This is not unlikely in practice given the nuclei will have similar colors and are in close proximity. For the example image shown in FIG. 8 it is assumed for simplicity there are no other segments identified in the image.

To help identify this situation the processing of FIG. 1 includes Step S24. In Step S24 the peripheries of the current segments are analysed for concavities/kinks, such seen in FIG. 8 at the ends of the dashed line where the two nuclei join. Kinks may be identified using conventional image analysis techniques, e.g., based on identifying sharp changes in gradient in the segment boundaries. Where a segment is found to comprise a pair of boundary kinks, it is assumed in step S24 that the kinks relate to where two separate segmentation targets are touching and have become deformed. Accordingly, the segment is split into two segments along a line joining the two kinks—i.e. along the dashed line in FIG. 8. Thus Step S24 helps identify segments comprising multiple touching features corresponding to the segmentation target of interest.

In an alternative embodiment, a step corresponding to Step S24 may be based on identifying only one kink in a segment boundary, and then splitting the segment along a line joining this kink to the nearest point on the other side of the boundary.

It will be appreciated that in some embodiments Step S24 may be iterative in that any split segments are also checked for boundary kinks for potential further splitting (i.e. in case a segment comprises more than two touching objects of interest).

In step S25, the remaining segments are considered in turn to check if they meet various pre-defined criteria based on the expected characteristics of the segmentation target of interest. For example, it may be the case that the segmentation target is expected to have a generally circular form. Segments may then be discounted from being considered to relate to the target of interest if they are considered to be too elongate. That is to say, for each segment a characteristic parameterisation of elongation may be determined and compared with a minimum elongation threshold. Segments with a characteristic elongation which is below this threshold may then, for example, be discounted form further consideration for the segmentation target of interest because they are considered not round enough. Various other geometric constraints may be used, e.g. based on area or linear dimension. Thus segments may be classified as to whether they correspond with the segmentation target of interest based on a comparison of a geometric characteristic of the segment with a pre-defined threshold for the geometric characteristic. Non-geometric characteristics may also be considered, e.g. the average intensity for each segment may be compared against an expected minimum or maximum for the segmentation target of interest, and the segments classified accordingly.

As above, appropriate thresholds to be used for this stage may be based on experience (i.e. "training" the algorithm by seeing how well it deals with test images). Thus a user may observe how well segments known to correspond to the segmentation target of interest in test images are identified/classified for different thresholds/parameters, and set thresholds/parameters to be used for subsequent automated processing of non-test images accordingly. In general, this sort of training can be used for different applications of the method to derive appropriate parameters for any of the characteristics on which the method is based, including all those discussed above. In this way a priori information regarding the expected characteristics of the segmentation target of interest can be used to improve the automated classification processing of FIG. 1.

Following the classification of Step S25, processing follows to Step S26. In Step S26 an indication of which segments meet the one or more classification criteria applied at step S25 is output. This may be provided in any of the known data structure formats for providing segmentation information. There may be none, one or more separate segments identified at this stage, These are the segments corresponding to regions of the image which are deemed according to the above-described processing to be associated with the segmentation target of interest for the current iteration.

Figure 7:
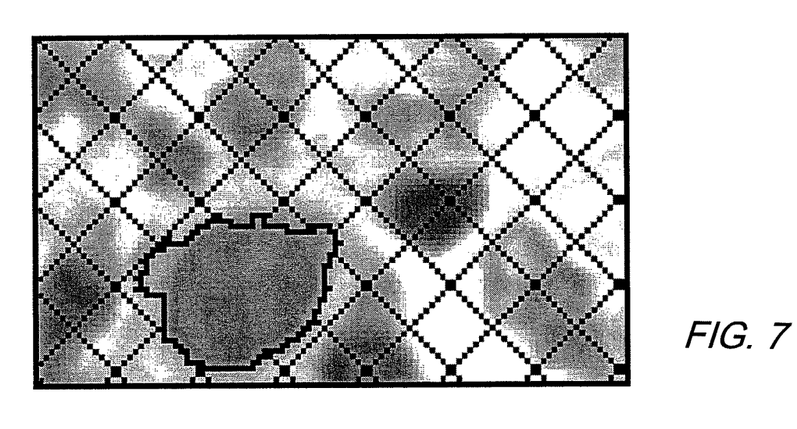
FIG. 7 schematically shows the image of FIG. 2 overlain with indications of a final segmentation during processing in accordance with the method represented in FIGS. 1A, 1B and 1C.

FIG. 7 schematically shows a visual indication of the final segmentation result stage of the processing applied to the image of FIG. 2. The image of the sample under study (after the filtering of Step S5) is shown with pixels at the boundaries between the finally identified segment shown black (in this example there is only one segment from those shown in FIG. 6 which meets the classification criteria applied in Step S25). Regions of the image of FIG. 7 identified by cross-hatching are regions deemed to be outside the mask generated at Step S3 for the image of FIG. 2, or segments which are classified in Step S25 as not relating to the target of interest.

The segmentation information provided at Step S26 may be used in various ways. For example, it may simply be displayed in an image such as FIG. 7 to aid a clinician in identifying features in an image corresponding to a segmentation target of interest. In other examples the segmentation information may be subject to further numerical processing. For example, in an automatic-screening analysis step an algorithm may count the number of final segmentation regions (segments) in an image to look for anomalous numbers of a given feature in a sample. Images showing anomalous occurrences of the segmentation target may then be tagged for further visual inspection/manual analysis by a clinician.

Thus the above-described method provides a scheme for segmenting images using color as the primary discriminator. The scheme is based on first over-segmenting an image, and then subsequently selectively rejoining neighboring segments if pre-defined rejoining criteria are met. The criteria may be based on a priori information about the expected characteristics of a target feature of interest. This general approach has been found by the inventor to provide more reliable automatic segmentation than seen with conventional techniques.

Thus to summarise the processing in accordance with some embodiments of the invention, a user creates a pixel color classifier to produce a mask that contains all image pixels of the expected nuclei color (Step S3). Completely enclosed holes in the mask are filled (Step S4), a noise reduction filter is applied to the image (Step S5), then the image area areas under the mask are over-segmented (split into regions of relatively similar color—each nucleus will typically be represented by multiple segments at this stage) using a color segmentation algorithm (Step S6). Next, all possible combinations of adjacent segments and the color differences between them are calculated and stored in a list of segment pairs sorted in order of increasing color difference (Steps S7 to S9). This list is then traversed in order and the segment pairs are joined if the joined segment would be similar enough in color to the original segments (Step S15) and not too large (Step S13), or if one of the pair is below a minimum size threshold (S20). A user may adjust these color and size thresholds until as many tumour nuclei as possible are each represented by single segments in a test image. It is not important how other parts of the image might segmented if the other segments are not the same shape and size as tumour nuclei. Segments may optionally be split where there is a concavity in their boundary. This can help where multiple touching nuclei have been joined into a single segment. Finally, the joined segments are classified according to characteristic parameters which may be used to identify the segmentation target of interest, e.g. characteristic area, elongatedness and/or average intensity, to eliminate segments that do not correspond to tumour nuclei.

Figure 9:
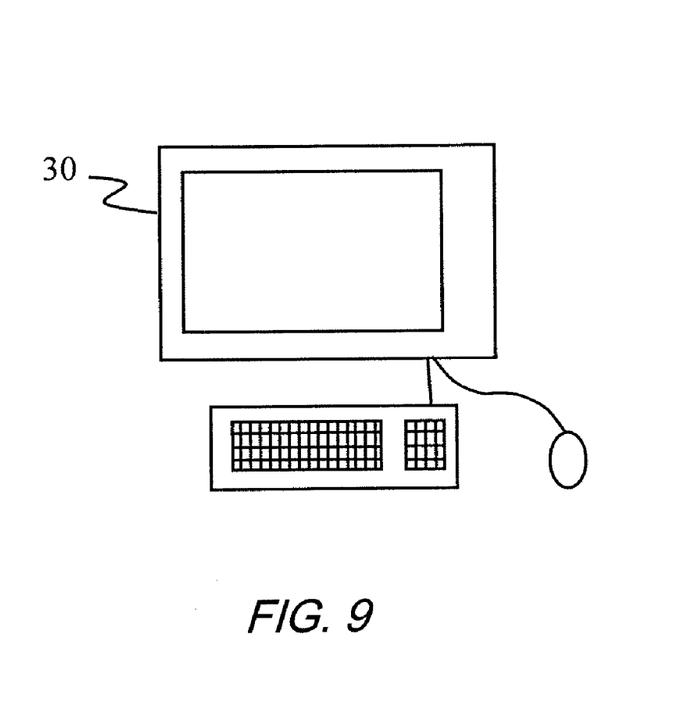
FIG. 9 schematically shows a computer running software for implementing a method according to an embodiment of the invention.

Embodiments of the invention may be implemented in software running on a computer, e.g., an application specific computer, such as might be coupled to a microscope, or a suitably programmed general purpose computer 30 such as shown in FIG. 9. Such a computer may also be incorporated in, or otherwise coupled to, a microscope for obtaining images, e.g. over a dedicated or network connection, for example.

Figure 10:
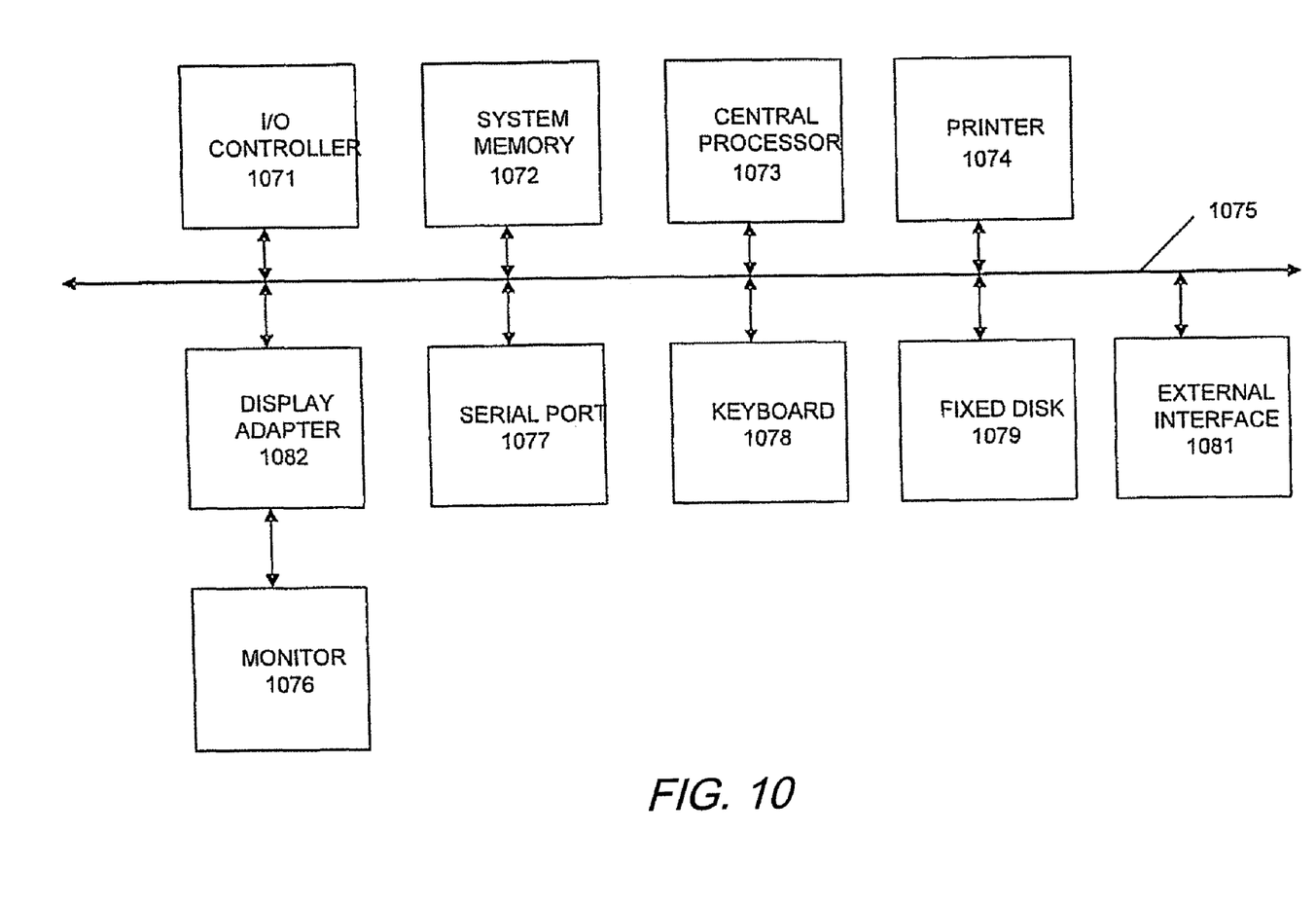
FIG. 10 shows a block diagram of an exemplary computer apparatus/terminal usable with system and methods according to embodiments of the present invention.

FIG. 10 shows a block diagram of an exemplary computer apparatus/terminal usable with system and methods according to embodiments of the present invention. The computer terminal may utilize any suitable number of subsystems. Examples of such subsystems or components are shown in FIG. 10. The subsystems shown in FIG. 10 are interconnected via a system bus 1075. Additional subsystems such as a printer 1074, keyboard 1078, fixed disk 1079, monitor 1076, which is coupled to display adapter 1082, and others are shown. Peripherals and input/output (I/O) devices, which couple to I/O controller 1071, can be connected to the computer system by any number of means known in the art, such as serial port 1077. For example, serial port 1077 or external interface 1081 can be used to connect the computer apparatus to a wide area network such as the Internet, a mouse input device, or a scanner. The interconnection via system bus allows the central processor 1073 to communicate with each subsystem and to control the execution of instructions from system memory 1072 (e.g. RAM) or the fixed disk 1079 (e.g. a magnetic hard drive, flash memory, or an optical disk), as well as the exchange of information between subsystems. The system memory 1072 and/or the fixed disk 1079 may embody a computer readable medium.

It will be appreciated that while the above description has focussed on microscopy imaging applications, processing in accordance with embodiments of the invention may also be applied to biological images obtained using other imaging apparatus, e.g. a line scanning device, a conventional camera, a scanner, a cytometry device, a cell imaging platform, high content imaging devices and/or cell separation devices e.g., a flow cytometry device or cell picking device.

Thus a method for classifying pixels in an image, e.g. a biological microscopy image of a sample, as being associated with a feature of interest has been described. A color brightfield microscopy image represented by color values for an array of pixels is conventionally obtained. The image is over-segmented based on the color values to provide a plurality of groups of contiguous pixels with related color values, whereby a typical feature of interest will be represented by multiple segments. A list of pairs of segments which are adjacent to one another in the image is generated, and a difference in average color value between the segments comprising each pair is determined. Pairs of adjacent segments are then selectively joined together to form a joined segment to replace the corresponding pair of segments in the list if pre-defined joining criteria are met. The pairs are considered for joining in an order based on their respective differences in average color value. Pixels are then classified as being associated with the feature of interest based on the segments following the selective joining. Segmentation information indicating the pixels classified as being associated with the feature of interest is thus provided.

Further particular and preferred aspects of the present invention are set out in the accompanying independent and dependent claims. It will be appreciated that features of the dependent claims may be combined with features of the independent claims as appropriate, and in combinations other than those explicitly set out in the claims.

What is claimed is:

1. A method for classifying pixels in an image as being associated with a feature of interest, the method comprising:
   (a) obtaining an input data set comprising color values for an array of pixels representing the image;
   (b) segmenting, with a computer, the image based on the color values to provide a plurality of segments, each segment comprising a group of contiguous pixels with related color values;
   (c) generating, with the computer, a list of all pairs of the plurality of segments which are adjacent to one another in the image;
   (d) determining, with the computer, a difference in average color value between the segments comprising each pair in the list;
   (e) selectively joining, with the computer, pairs of adjacent segments to form a joined segment to replace the corresponding pair of segments in the list according to at least one pre-defined joining criterion, wherein pairs of segments are considered for joining in an order based on the respective differences in average color values;
   (f) classifying, with the computer, pixels as being associated with a feature of interest based on the segments following the selective joining; and
   (g) providing an output data set indicating pixels classified as being associated with the feature of interest.

2. The method of claim 1, wherein the at least one pre-defined joining criterion of step (e) is such that a pair of segments is not joined if their combined size in the image is greater than a pre-defined maximum segment size threshold.

3. The method of claim 1, wherein the at least one pre-defined joining criterion of step (e) is such that a pair of segments is joined if at least one of the segments has a size in the image that is less than a pre-defined minimum segment size threshold.

4. The method of claim 1, wherein the at least one pre-defined joining criterion of step (e) is such that a pair of segments is not joined if the resulting average color value for the joined segment would differ from the average color value of any of the segments from step (b) which comprises the pair of segments by more than a pre-defined maximum average color difference threshold.

5. The method of claim 1, wherein step (e) is performed such that pairs of segments are considered for joining in an order in which the pair of segments currently having the smallest difference in average color values and which has not previously been considered for joining is the pair next considered for joining 6. The method of claim 1, further comprising identifying a subset of the pixels potentially associated with the feature of interest based on their color values, and wherein the segmenting of step (b) is applied to pixels within this subset.

7. The method of claim 6, further comprising adding to the subset of pixels further pixels which are not included in the subset of pixels based on their color values, but which are fully surrounded in the image by a contiguous region of pixels which are included in the subset of pixels based on their color values.

8. The method of claim 1, wherein the segmenting of step (b) is based on a Color Structure Code (CSC) algorithm.

9. The method of claim 1, wherein the segmentation of step (b) is performed such that a typical feature of interest in the image having an associated typical range of color values is segmented into multiple segments.

10. The method of claim 9, wherein the number of multiple of segments is selected from the group comprising at least 3, at least 4, at least 5, at least 6, at least 7, at least 8, at least 9, and at least-10 segments.

11. The method of claim 1, further comprising a step performed after step (e) of selectively splitting segments into pairs if a pre-defined splitting criterion is satisfied.

12. The method of claim 11, wherein the splitting criterion is such that a segment having a kink in its boundary is split along a line joining to the kink.

13. The method of claim 1, wherein step (f) comprises classifying those pixels within a subset of the segments resulting from the selective joining as being associated with a feature of interest, where the subset of segments corresponds to the segments which meet a pre-determined classification criterion.

14. The method of claim 13, wherein the pre-determined classification criterion is based on comparing a geometric characteristic of the segments in the image with a corresponding pre-determined geometric characteristic threshold.

15. The method of claim 14, wherein the geometric characteristic comprises a characteristic selected from the group comprising an areal extent, a linear dimension, and a measure of elongatedness.

16. The method of claim 13, wherein the pre-determined classification criterion is based on comparing a color characteristic for the segments in the image with a corresponding pre-determined range of color characteristics.

17. An apparatus for classifying pixels in an image as being associated with a feature of interest, the apparatus comprising:
   a source for an input data set comprising color values for an array of pixels representing the image;
   and a processor configured to:
      segment the image based on the color values to provide a plurality of segments comprising respective groups of contiguous pixels with related color values;
      generate a list of all pairs of the plurality of segments adjacent to one another in the image;
      determine a difference in average color between the segments comprising each pair in the list;
      selectively join pairs of adjacent segments to form a joined segment to replace the corresponding pair of segments in the list according to at least one pre-defined joining criterion, wherein pairs of segments are considered for joining in an order based on their respective differences in average color values;
      classify pixels as being associated with a feature of interest based on the segments following the selective joining; and
      generate an output data set representing pixels classified as being associated with the feature of interest.

18. A non-transitory computer program product comprising a computer readable medium storing a plurality of instructions for controlling a processor to perform an operation for generating an output data set representing a classification of pixels in an image, the instructions comprising:
   (a) obtaining an input data set comprising color values for an array of pixels representing the image;
   (b) segmenting the image based on the color values to provide a plurality of segments, each segment comprising a group of contiguous pixels with related color values;
   (c) generating a list of all pairs of the plurality of segments which are adjacent to one another in the image;
   (d) determining a difference in average color value between the segments comprising each pair in the list;

(e) selectively joining pairs of adjacent segments to form a joined segment to replace the corresponding pair of segments in the list according to at least one pre-defined joining criterion, wherein pairs of segments are considered for joining in an order based on the respective differences in average color values;

(f) classifying pixels as being associated with a feature of interest based on the segments following the selective joining; and (g) providing an output data set indicating pixels classified as being associated with the feature of interest.

\* \* \* \* \*